US012383907B2

(12) United States Patent
Mann et al.

(10) Patent No.: US 12,383,907 B2
(45) Date of Patent: Aug. 12, 2025

(54) CENTRIFUGE AND METHOD FOR CLEANING A CENTRIFUGE

(71) Applicant: BlueCatBio GmbH, Neudrossenfeld (DE)

(72) Inventors: Wolfgang Mann, Neudrossenfeld (DE); Frank Feist, Concord, MA (US)

(73) Assignee: BlueCatBio GmbH, Neudrossenfeld (DE)

( * ) Notice: Subject to any disclaimer, the term of this patent is extended or adjusted under 35 U.S.C. 154(b) by 0 days.

(21) Appl. No.: 17/941,262

(22) Filed: Sep. 9, 2022

(65) Prior Publication Data

US 2023/0077651 A1 Mar. 16, 2023

(30) Foreign Application Priority Data

Sep. 16, 2021 (DE) ..................... 10 2021 124 023.9

(51) Int. Cl.
*B08B 9/08* (2006.01)

(52) U.S. Cl.
CPC ............ *B01L 13/02* (2019.08); *B08B 9/0821* (2013.01); *B01L 2400/0409* (2013.01); *B08B 2209/08* (2013.01)

(58) Field of Classification Search
CPC ............. B01L 13/02; B01L 2400/0409; B01L 2300/0829; B08B 9/0821; B08B 2209/08; B08B 3/003; B08B 3/104; B08B 9/0804; B04B 5/0407; B04B 7/02; B04B 15/06
See application file for complete search history.

(56) References Cited

U.S. PATENT DOCUMENTS 4,146,476 A * 3/1979 Spiewok ................ B01D 33/11 210/791
4,953,575 A 9/1990 Tervamaki
5,104,371 A * 4/1992 Ajnefors ................. B04B 15/06 494/70

(Continued)

FOREIGN PATENT DOCUMENTS

CN 102175855 A 9/2011
CN 113000230 A 6/2021

(Continued)

OTHER PUBLICATIONS

SE461355B Written Description (Year: 1990).*

(Continued)

*Primary Examiner* — Michael E Barr
*Assistant Examiner* — Arlyn I Rivera-Cordero
(74) *Attorney, Agent, or Firm* — HoustonHogle LLP

(57) ABSTRACT

The invention relates to a centrifuge for cleaning a reaction vessel unit and to a method for cleaning such a centrifuge. The centrifuge has a rotor and a rotor chamber, in which the rotor is arranged and mounted, the rotor features a receiving area for receiving the reaction vessel unit. The rotor chamber is limited by a housing, the housing having an outlet to drain the liquid discharged from the reaction vessels and being provided with an inlet for filling the rotor chamber with a cleaning solution in such a way, when the rotor rotates, the rotor 2 is at least partially immersed in the cleaning solution and distributes it in rotor chamber and/or the inlet is designed in such a way that the cleaning solution is distributed in rotor chamber when it is supplied by the rotating rotor.

14 Claims, 5 Drawing Sheets

(56) References Cited

U.S. PATENT DOCUMENTS

| | | | | |
|---|---|---|---|---|
| 10,338,063 | B2 * | 7/2019 | Wang | B08B 3/02 |
| 11,117,142 | B2 | 9/2021 | Mann et al. | |
| 2003/0073602 | A1 * | 4/2003 | Ramirez, Jr. | C11D 3/0031<br>510/505 |
| 2007/0037684 | A1 | 2/2007 | Moscone et al. | |
| 2008/0045396 | A1 * | 2/2008 | Aagaard | B04B 5/02<br>494/50 |
| 2019/0022670 | A1 * | 1/2019 | Mann | B04B 11/04 |

FOREIGN PATENT DOCUMENTS

| | | | | | |
|---|---|---|---|---|---|
| DE | 2404036 | A1 | | 7/1975 | |
| DE | 10355179 | A1 | | 6/2005 | |
| DE | 102016101163 | A1 | | 7/2017 | |
| EP | 0937502 | A2 | | 8/1999 | |
| EP | 2705903 | A1 | | 3/2014 | |
| JP | S5143967 | U | | 3/1976 | |
| JP | 3676346 | B2 | * | 7/2005 | |
| JP | 2007178355 | A | | 7/2007 | |
| JP | 2009264927 | A | | 11/2009 | |
| SE | 461355 | B | * | 2/1990 | B04B 11/043 |
| WO | WO 2015018878 | A2 | | 2/2015 | |
| WO | WO 2017125598 | A1 | | 7/2017 | |
| WO | WO 2018234420 | A1 | | 12/2018 | |

OTHER PUBLICATIONS

Kevin Dunn, Dunn Reference, Nov. 2, 2018, Wholesale Supplies Plus, ("https://www.wholesalesuppliesplus.com/handmade101/learn-to-make-articles/chemistry-behind-alcohol-and-MP-soap.aspx") (Year: 2018).*

JP 3676346 B2 Written Description (Year: 2005).*

German Search Report mailed on Aug. 19, 2022, from German Application No. 10 2021 124 023.9, filed on Sep. 16, 2021. 7 pages.

European Search Report, completed on Feb. 20, 2023, from European Application No. EP 22196177.4 7 pages.

German Examination Notice, mailed on Dec. 6, 2024, from from German Application No. 10 2021 124 023.9, filed on Sep. 16, 2021. 8 pages.

European Search Report, mailed on Feb. 18, 2025, from European Application No. EP 24213729.7. 12 pages.

* cited by examiner

CENTRIFUGE AND METHOD FOR CLEANING A CENTRIFUGE

RELATED APPLICATIONS

This application claims priority to German Patent Application No. DE 10 2021 124 023.9, filed on Sep. 16, 2021, which is incorporated herein by reference in its entirety.

BACKGROUND OF THE INVENTION

The EP 937502 A2 describes a method for handling a microtiter plate, wherein the microtiter plate is cleaned by means of centrifugation. For this purpose, the microtiter plate is placed in the rotation housing via a conveyor belt so that the openings of the microtiter plate are directed away from the axis of rotation.

The WO 2015/018878 A1 discloses another centrifuge comprising an elastic arm with which microtiter plates can be pulled into a rotor of the centrifuge or pushed out of this rotor. The rotor has only a very short distance to the surrounding housing and also to the gutter arranged in the lower area. This short section is intended to drive the liquid that has leaked from the reaction vessels into the gutter by means of the resulting circulation wind and then pump it out by using a pump. Due to the small distance, there is a risk that the liquid level will be above the gutter. This can cause the rotor to submerge in the liquid as it rotates. This is especially critical if the liquid is a wash solution containing detergents, as the rotor will then beat the liquid into foam. This foam can quickly fill much of the volume of the rotor and escape at the door. Also, the foaming material cannot be pumped out well by the pump described, but rather remains in the rotor chamber or in the gutter. The close distance of the rotor to the gutter results mainly from the cylindrical shape of the rotor chamber, which is chosen in such a way to generate the desired circulation wind.

It is known that in cylindrical rotor chambers of centrifuges, circulation winds are generated by the rotating rotor. In this context, reference is made to US 2007/0037684 A1, DE 103 55 179 A1, DBP 1033446, EP 2 705 903 A1 and DE 2404036.

WO 2018/234420 A1 discloses another centrifuge for cleaning reaction vessel units. This centrifuge comprises a rotor and a rotor chamber in which the rotor is rotatably mounted. A reaction vessel unit is inserted into the centrifuge with its openings facing outwards, so that when the rotor is rotated, the reagents inside are driven out of the respective reaction vessels. This allows the reaction vessels to be cleaned with substantially no residue. This centrifuge can have a dispensing unit, said dispensing unit comprising multiple dispensing nozzles. The dispensing nozzles are preferably arranged side by side along a line, this line extending transversely to the direction of movement of the reaction vessel unit during loading or unloading of the centrifuge. The nozzles of the dispensing unit are arranged adjacent to an opening for loading and unloading the centrifuge with the reaction vessel unit.

Another centrifuge is disclosed in WO2017/125598 A1, which in turn has a loading and unloading device, in which reaction vessel units are positioned by means of a rigid sliding rod.

CN 102175855 A discloses a fully automatic 360° plate washing machine. The axis of rotation of this machine runs parallel to the horizontal plane, allowing multiple plates to be washed simultaneously in one housing, thereby increasing efficiency and greatly reducing costs.

U.S. Pat. No. 4,953,575 concerns a washing device for cuvettes. For this purpose, the cuvettes are placed in a holder in a rotor. By rotating the rotor, the liquid is removed from the cuvettes. The disclosed centrifuge housing has an opening at its lowest point through which the removed liquid can leave the housing.

JP 2009264927 A discloses a device comprising a drum in which a microtiter plate can be placed. The drum can be loaded with multiple microtiter plates, which then rotate around a horizontal axis of rotation. The drum is loaded with the microtiter plate in such a way that its openings are directed towards the inside of the drum.

SUMMARY OF THE INVENTION

The present invention relates to a centrifuge for cleaning a reaction vessel unit with a rotor and a rotor chamber, in which the rotor is arranged and rotatably mounted, the rotor comprising a receiving area for receiving the reaction vessel unit. Furthermore, the invention relates to a method for cleaning such a centrifuge.

The invention is based on the object of creating a centrifuge for cleaning a reaction vessel unit, which has a rotor and a rotor chamber in which the rotor is rotatably mounted, whereby contamination is to be avoided with the centrifuge and reliable long term operation is possible.

The object is solved by the objects according to the independent patent claims. Advantageous embodiments of the invention are specified in the respective subclaims.

A centrifuge for cleaning a reaction vessel unit according to the present invention comprises a rotor and a rotor chamber in which the rotor is arranged and mounted, the rotor comprising a receiving area for receiving the reaction vessel unit. The rotor chamber is limited by a housing, the housing having a drain to remove liquid discharged from the reaction vessels, and is provided with an inlet for filling the rotor chamber with a cleaning solution in such a way that the cleaning solution is distributed in the rotor chamber by rotation of the rotor, without the reaction vessel unit by contact with the rotor so that the rotor chamber (9) is cleaned.

The axis of rotation of the rotor preferably runs parallel to a footprint.

A cleaning solution can thus be fed to this centrifuge and distributed in the rotor chamber. The rotor is used here to distribute the cleaning solution. This will be discussed in more detail below in the description of the process for cleaning the centrifuge.

As the rotor rotates, it can be at least partially immersed in the cleaning solution and distribute it in the rotor chamber and/or the intake is designed in such a way that the cleaning solution is distributed in the rotor chamber as it is fed through the rotating rotor. Thereby the cleaning solution can come into contact with the rotor and be distributed by the centrifugal forces occurring at the rotor and/or be entrained by the air flow generated by the rotor and thus distributed.

When cleaning a reaction vessel unit in a centrifuge, during which the contents of the reaction vessels are ejected from the reaction vessel unit, there is a risk that residues of the reaction vessel contents remain in the rotor chamber and may be transferred to another reaction vessel unit. This is particularly critical if chemical or biological samples are contained in the reaction vessel units. In the case of biological samples, a single molecule, such as a section of a DNA strand, that is transferred to another reaction vessel unit can be an intolerable contamination.

Such centrifuges for cleaning a reaction vessel unit are now used with great success. However, they must be cleaned at regular intervals. The design of the centrifuge according to the present invention allows an independent or automatic cleaning of the centrifuge. This allows the centrifuge to be part of an automatic process and to be subjected to a cleaning process from time to time without the need for manual intervention by an operator. For example, the centrifuge can be cleaned several times in a work cycle lasting several hours without the need for manual intervention. This is a significant advantage compared to conventional centrifuges for cleaning reaction vessel units.

The outlet of the housing can also form the inlet. For example, an opening in the housing that forms the outlet or inlet may be connected to a fluid line that has a branch, so that the fluid line branches into an inlet line and an outlet line. The outlet line is designed to discharge a fluid and the inlet line is designed to supply a fluid. The outlet line has a blocking element for blocking the outlet line. If the outlet line is blocked by means of the blocking element, the fluid or a cleaning solution can be supplied via the inlet line without it flowing through the outlet line and is supplied exclusively to the rotor chamber.

The blocking element can be a valve or preferably an automatically actuated hose clamp if at least part of the outlet line is designed as a hose. The hose clamp can be provided with an actuator to operate it automatically. The actuator can be designed as an eccentric or as an electric or pneumatic piston mechanism.

The inlet line can also be fluidically coupled to a dispensing device integrated in the centrifuge, so that the inlet line can be supplied with a cleaning solution by means of the dispensing device. In such an embodiment of the centrifuge, the dispensing device has both the function of dispensing solutions in reaction vessels of the reaction vessel units and of supplying the cleaning solution to the rotor chamber.

The drain can be equipped with a suction pump and a siphon, whereby the siphon is designed in such a way that when the suction pump is not actuated, a liquid with a fill level below a predetermined fill level remains in the rotor chamber. In this way, non-actuation of the suction pump can ensure that a cleaning solution present in the rotor chamber remains in the rotor chamber, provided that the level of the cleaning solution is not above the predetermined fill level. The level of this predetermined fill level is preferably selected in such a way that a rotor immerses in the liquid during rotation and carries it along at least partially. The siphon thus forms the blocking element by means of which the outlet line is blocked up to a certain fill level, provided that the suction pump is not actuated.

A level sensor can be provided in the rotor chamber to detect the fill level. The level sensor can be an ultrasonic sensor with which the surface of the liquid is scanned. It is useful to rotate the rotor to a position so that it does not interfere with the measurement. The fill level can also be formed by one or more temperature sensors, which are attached to the inner surface of the housing and are used to measure a specific level of liquid.

The inlet can be located above an axis of rotation of the rotor so that the cleaning solution can come into contact with the rotor when it is fed in. The rotor can, of course, be in a position in which it does not come into contact with the cleaning solution conveyed by means of the inlet, e.g. when it is aligned vertically. Thereby a cleaning fluid supplied in this way is carried along by a rotating rotor, in particular a quickly rotating rotor, and distributed in the rotor chamber. Even low speeds of a few rpm are sufficient for this. As a rule, the rotor is rotated at speeds of at least 10 rpm or at least 50 rpm or more. The rotor should not be rotated faster than 100 rpm when the cleaning solution is inserted into the rotor chamber to a predetermined level so that the rotor can be immersed in the cleaning solution. If, on the other hand, the cleaning solution is inserted into the rotor chamber, for example by vaporizing, without the cleaning solution collecting at the bottom of the rotor chamber, then the rotor can also be operated at higher speeds of, for example, at least 100 rpm. Here, speeds of at least 500 rpm or at least 1000 rpm may also be appropriate.

The inlet can also have one or more nozzles to atomize the cleaning solution into the rotor chamber. A cleaning liquid atomized in this way in the rotor chamber can also be evenly distributed in the rotor chamber by rotating the rotor.

The rotor chamber can be is filled with the cleaning solution up to a predetermined level, and in that the rotor is designed in such a way that, during rotation, it is at least partially immersed in the cleaning solution and distributes it in the rotor chamber.

Another aspect of the invention relates to a method of cleaning a centrifuge for cleaning a reaction vessel unit, the centrifuge comprising a rotor and a rotor chamber, in which the rotor is arranged and rotatably mounted, the rotor comprises a receiving area for receiving the reaction vessel unit. In this procedure, the following steps are performed:

- The rotor chamber is filled with a cleaning liquid either at least to a predetermined level so that when the rotor is rotated it is at least partially immersed in the cleaning solution, and/or the cleaning solution is supplied to the rotor chamber in such a way that it can either come into contact with the rotor and/or is inserted into an area of the rotor chamber where it is entrained by an air stream as the rotor rotates,
- The rotor is rotated/moved, which distributes the cleaning solution in the rotor chamber, and
- the cleaning solution is removed from the rotor chamber.

When the cleaning solution is removed, the contaminants in the rotor chamber are taken along. The cleaning solution can be flow off via the drain and thus be removed from the rotor chamber. This can be controlled, for example, by opening a blocking element in a drain pipe.

The rotor has two functions in such a centrifuge. On the one hand, the rotor serves to empty the reaction vessel units ejecting the contents from the individual reaction vessels of the reaction vessel units by rotating the rotor. On the other hand, the rotor also serves to distribute the cleaning solution in the rotor chamber and thus to ensure an even and reliable cleaning of the rotor chamber. On the one hand, the distribution of the cleaning solution can be achieved by the rotor being at least partially immersed in the cleaning solution during rotation and carrying it along. However, the cleaning solution can also be supplied in such a way that it is carried along directly by the rotor or with the air draft generated by the rotor and distributed in the rotor chamber. This applies in particular if the cleaning solution is atomized into the rotor chamber, in which case a mist of the cleaning solution is distributed evenly in the rotor chamber by rotating the rotor.

The cleaning solution can be a non-foaming cleaning solution containing, for example, formaldehyde or paraformaldehyde. Such a non-foaming cleaning solution can drain out of the rotor chamber by itself, without any further activities. Rotation of the rotor may serve to propel the cleaning solution to the drain and remove it from the rotor chamber. However, the cleaning solution can also drain off automatically when the rotor is stationary if the drain pipe is correspondingly unblocked.

The cleaning solution can also be a foaming cleaning solution, in particular a cleaning solution containing surfactants. When the cleaning solution is distributed through the rotor, the cleaning solution foams in the rotor chamber. To remove the foamed cleaning solution, a foam-degrading solution can be fed to the rotor chamber, which contains alcohol, for example. This causes the foam to collapse and flow off through the drain. The flowing off or removal of the cleaning solution from the rotor chamber can also be supported here by rotating the rotor in the same way as for the non-foaming cleaning solution.

The one foam degrading solution can also be distributed in the rotor chamber during or after feeding by rotating the rotor to effectively distribute the foam degrading solution in the rotor chamber.

A centrifuge explained above can be used in this process.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
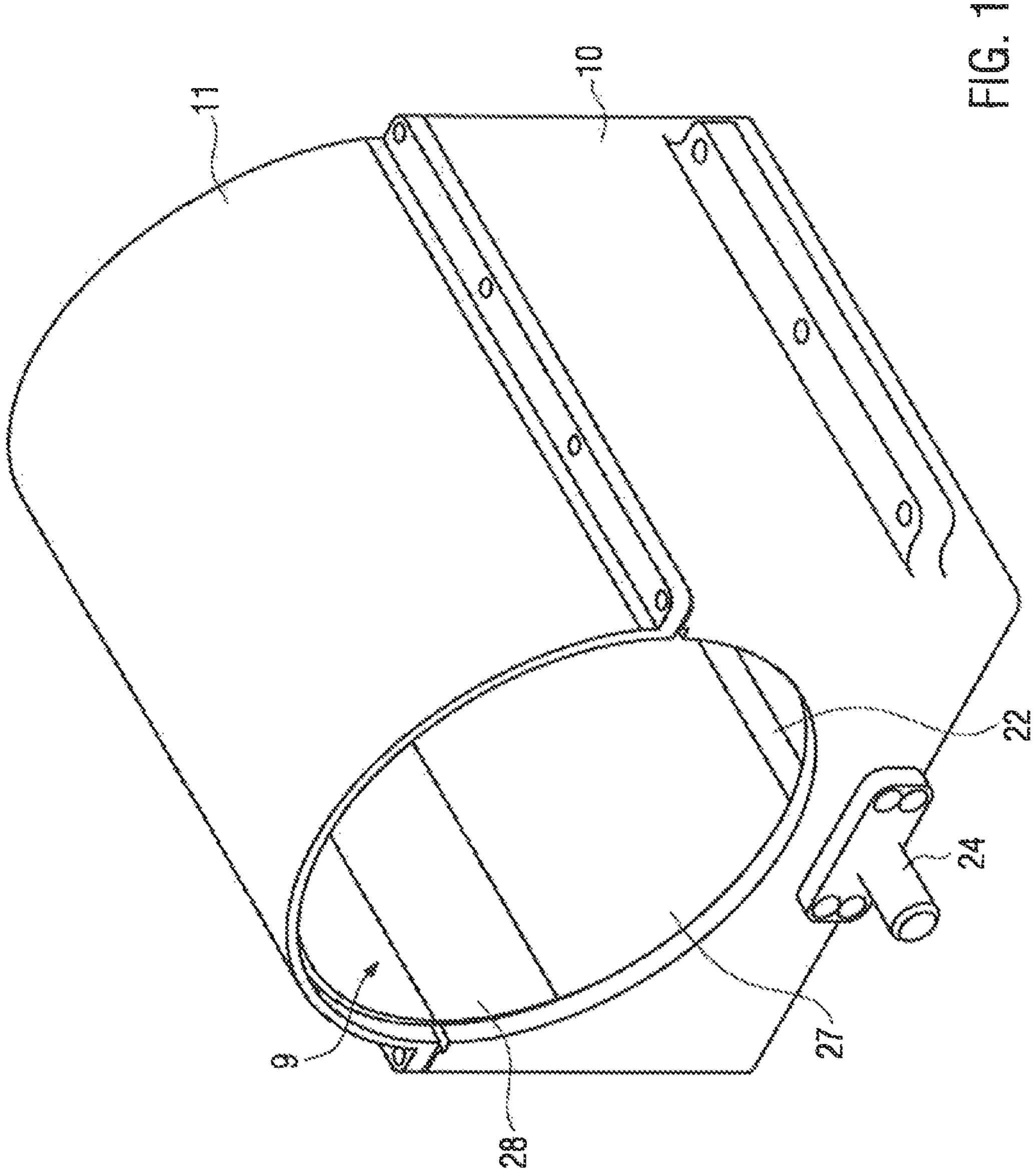
FIG. 1 apart of a housing of a centrifuge in perspective view.

A centrifuge 1 according to the present invention (FIG. 4*a*) has a rotor 2, a housing 3, a drive device 4 for rotating the rotor 2 around an axis of rotation 5.

The rotor has at least one receiving area 6 for receiving a reaction vessel unit 7. The reaction vessel unit 7 is usually a microtiter plate. Such microtiter plates can be designed with a different number of reaction vessels. Microtiter plates with six to 4096 reaction vessels are common, with microtiter plates with 96, 384 or 1536 reaction vessels being the most common versions. For microtiter plates with 384 or 1536 reaction vessels, the individual reaction vessels are so thin that a liquid will normally adhere therein due to capillary forces alone, so that even when such a microtiter plate is placed with its openings facing downward, the liquid will not flow out. This does not apply to microtiter plates with fewer reaction vessels, each of which is larger. Such a reaction vessel unit 7 can be inserted alone into a receiving area 6 or on a carrier unit. Preferably, a carrier unit is used, which has a coupling element that can be coupled to a loading and unloading device 8. Such a loading and unloading device is described, for example, in DE 10 2016 101 163. It is explained in more detail below.

The housing 3 limits a rotor chamber 9. In the present embodiment example, the area of the housing 3 that limits the rotor chamber 9 is formed from a lower shell 10, upper shell 11, front end wall 12 and rear end wall 13. Adjacent to the rear end wall are further parts of the housing, which are not shown in the accompanying figures.

The front end wall 12 and rear end wall 13 each contain a ball bearing 14 in which a continuous shaft 15 of the rotor 2 is rotatably mounted. The center line of shaft 15 forms the axis of rotation 5. The axis of rotation 5 runs parallel to a footprint 16, which is formed by the underside of the lower shell 10.

The rear end of the shaft 15 is coupled to the drive device 4. The further part of the housing, which adjoins the rear end of the housing, contains the drive device 17, the loading and unloading device 8, and a central control device (not shown), with which all components of the centrifuge 1 are controlled.

A balcony 18 is attached to the outside of the front end wall 12 that serves to take in a reaction vessel unit 7. At the height of the balcony 18, a loading and unloading opening 19 is provided in the front end wall 12, through which a reaction vessel unit 7 can be inserted into the rotor chamber 9 and pushed out again. The loading and unloading opening 19 is provided with a pivotal door 20 so that the rotor chamber can be closed.

Adjacent to this door 20, a dispensing unit 39 with several dispensing nozzles 40 and/or an optical detection unit, in particular in the form of a line scan camera, can be provided.

The loading and unloading device 8 has a sliding rod (not shown), which can be moved horizontally through the rotor chamber 9 with its free end through a passage opening 21 in the rear end wall 13. The loading and unloading device 8 has a linear drive for this purpose, so that the sliding rod can be moved linearly along its longitudinal direction. The sliding rod has a coupling element at its free end, which can be coupled to a corresponding coupling element on the carrier unit or on a reaction vessel unit 7, so that the carrier unit with a reaction vessel unit or the reaction vessel unit can be moved directly by moving the sliding rod from the balcony 18 through the loading and unloading opening 19 into rotor chamber 9, the rotor 2 being arranged in this case with a receiving area 6 adjacent to the loading and unloading opening 19, so that the carrier unit or reaction vessel unit is moved into the receiving area 6 of rotor 2. The coupling between the sliding rod and the carrier unit or the reaction vessel unit 7 can be released so that the carrier unit or reaction vessel unit is freely movable in the rotor 2 and the rotor can be rotated accordingly with this unit.

By means of the sliding rod of the loading and unloading device 8, the carrier unit or reaction vessel unit 7 can be pushed out of receiving area 6 to the rotor 2 through the loading and unloading opening 19 back onto the balcony 18. At the balcony 18, the reaction vessel unit 7 can be removed, for example, by means of a robot.

Figure 4A:
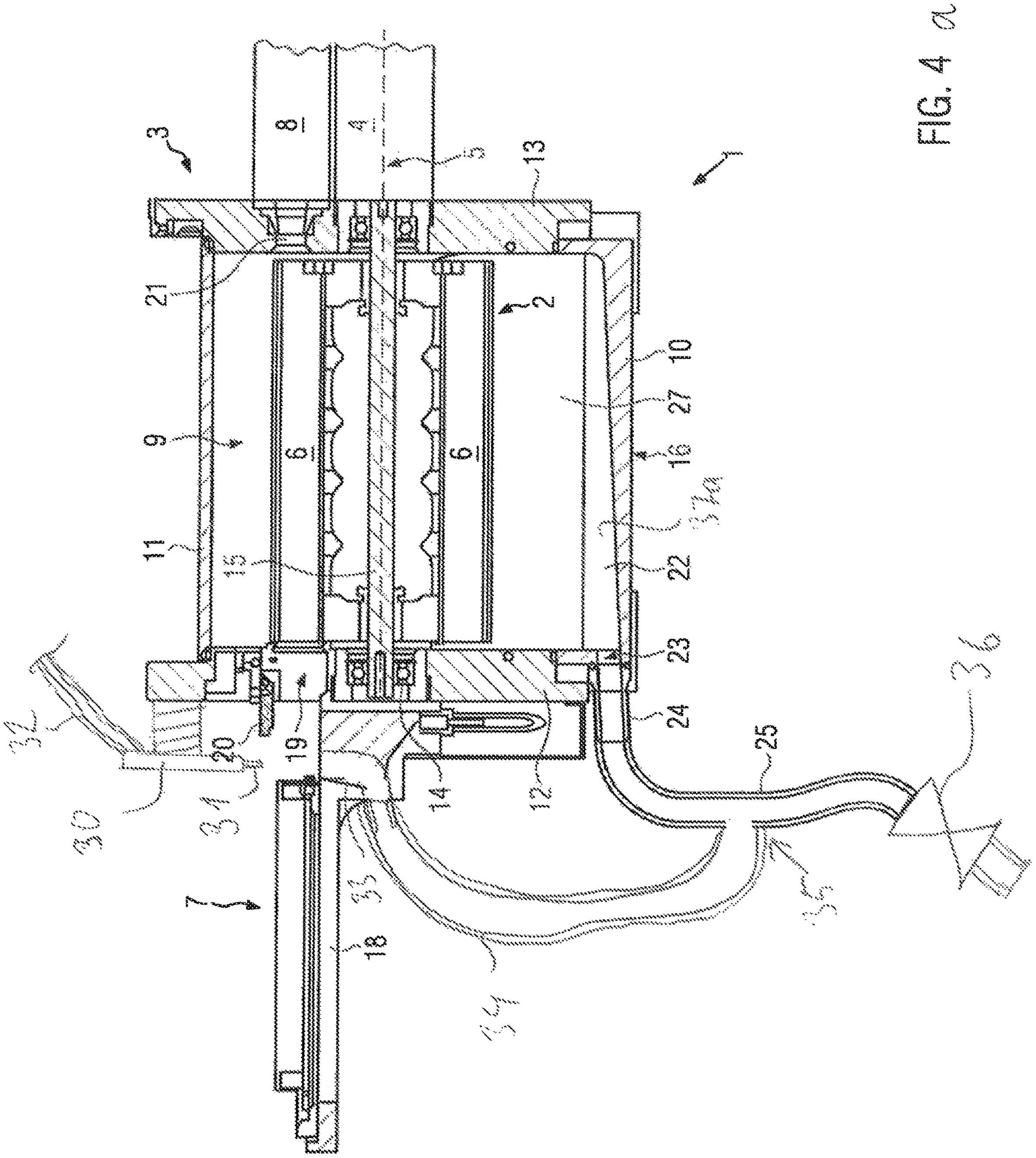

The lower shell 10 has a channel 22, which runs approximately parallel to the axis of rotation 5. The channel 22 extends from the rear end wall 13 to the area of the front end wall 12, wherein it is inclined or sloping towards the front (FIG. 4*a*). An outlet opening 23 is formed at the front side of the lower shell 10, at which the channel 22 there is an outlet opening 23 where the channel 22 flows. A connecting pivot 24 is arranged at the outlet opening 23, to which a hose 25 can be connected. The hose 25 generally opens into a receiving container (not shown), in which the liquids are received which are ejected from the reaction vessels of the reaction vessel unit 7 in the centrifuge 1. The container preferably has a ventilation opening or the hose extends through the container with some clearance so that the liquid exiting the centrifuge through the hose 25 does not generate any back pressure in the container.

Figure 2:
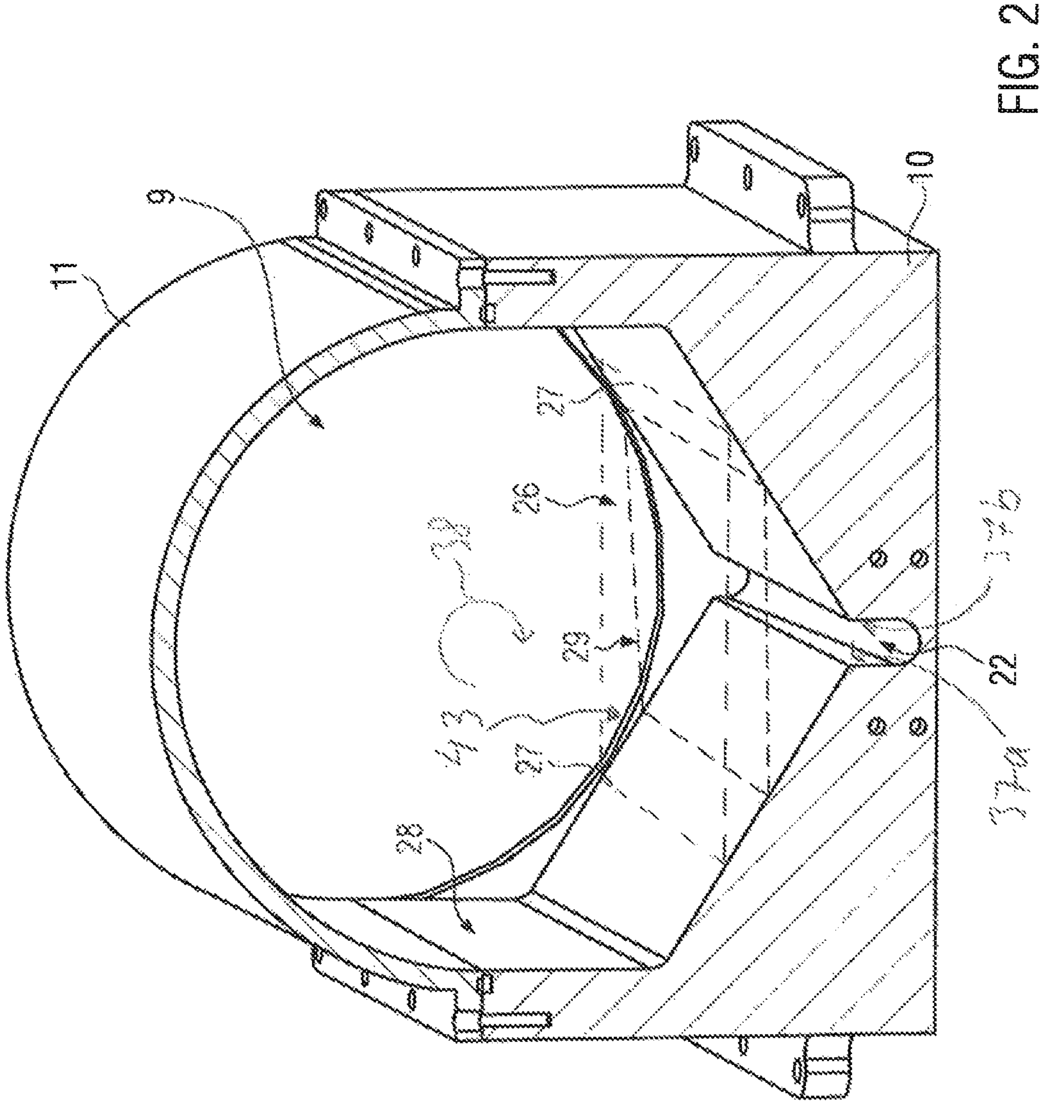
FIG. 2 a sectional view of the part of the housing from FIG. 1, viewed from an oblique front, FIG. 3 the part of the housing from FIG. 1 in a longitudinal section, FIG. 4*a* the centrifuge according to a first embodiment with the housing part of FIG. 1 in a longitudinal section, and FIG. 4*b* a longitudinal section of the centrifuge according to a second embodiment with the housing part of FIG. 1.
Figure 3:
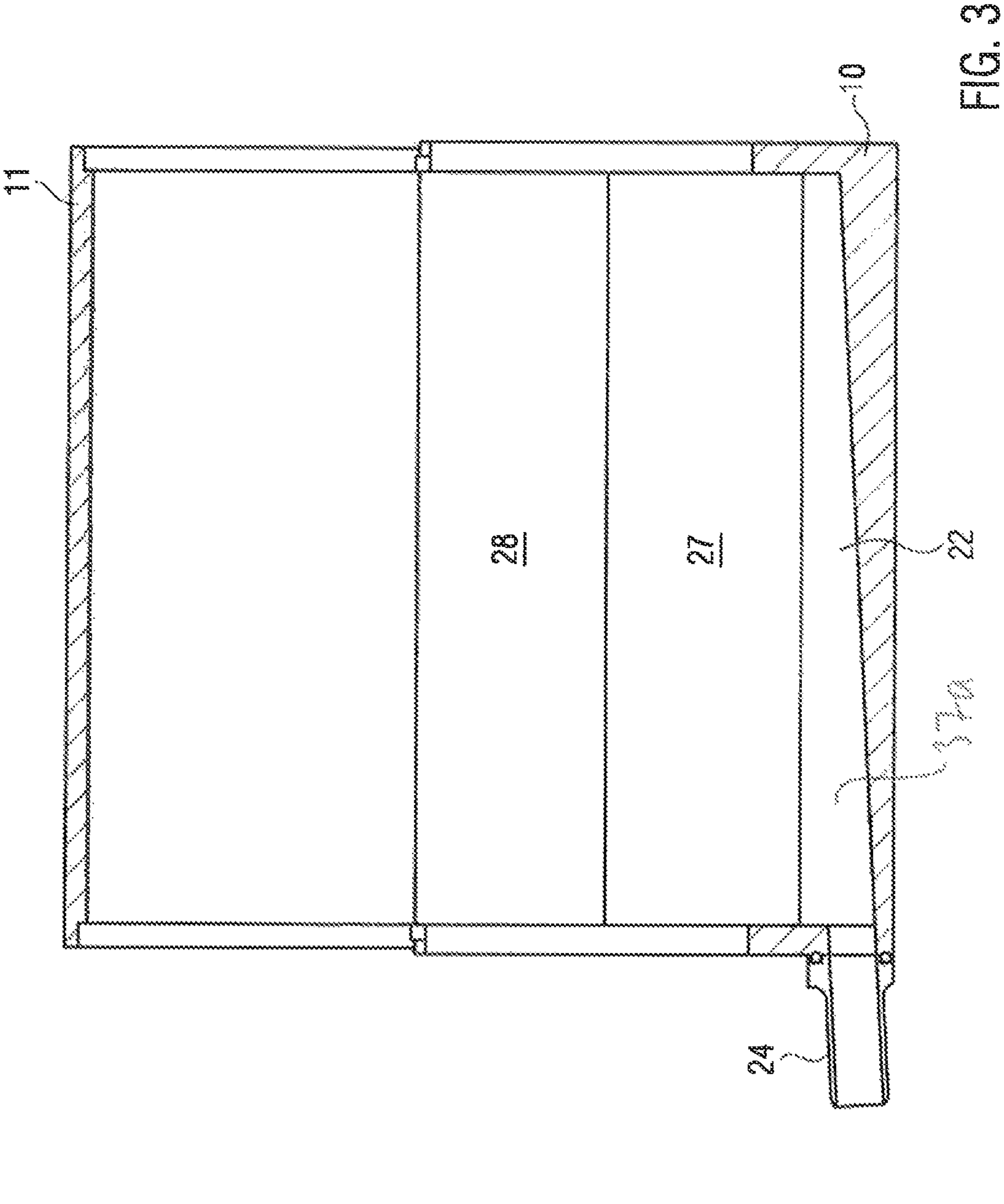

The lower shell 10 has interior surfaces adjacent to the channel 22, each of which slopes outwardly from an upper edge of the channel 22 (FIG. 2). Therefore, these inner surfaces form a funnel 26 and are hereafter referred to as funnel surfaces 27. The funnel surfaces 27 are inclined at an angle of about 30° to 60° with respect to the horizontal. Substantially planar means that the funnel surfaces have a radius of curvature of more than 0.5 m and preferably more than 1 m. In the present embodiment example, the funnel surfaces 27 extend laterally in the direction beyond the area of the rotor 2, even when it is in its horizontal position.

From the outer edge of the funnel 26 or the funnel surfaces 27, the inner surfaces of the lower shell 10 extend approximately vertically upwards. They thus form vertical surfaces 28.

The upper shell 11 is attached to the upper edge of the lower shell 10, which has a channel-like shape of a semi-circular shape in cross-section. The inner surface of the upper shell 11 merges flush with the vertical surface 28. The cross-section of the housing 3 is therefore not cylindrical, but only has a cylindrical curvature in the upper area of the shell 11, whereas the lower shell 10 is funnel-shaped in cross-section and ends in the channel 22. The channel 22 is slightly depositioned downwardly from the funnel-shaped lower shell 10 and has two side walls 37*a*, 37*b* arranged approximately vertically. The channel itself is formed with a slope so that a liquid therein drains.

In the present embodiment, the lower shell 10 and the upper shell 11 are formed of metal. The inner surfaces of the lower shell 10 and the upper shell 11 are coated with a smooth plastic layer so that liquids ejected from the reaction vessels of the reaction vessel units 7 drain rapidly along the inner surfaces, are guided by the funnel 26 to the channel 22 and exit the rotor chamber 9 there. The plastic layer is made of PTFE (polytetrafluoroethylene).

The upper edge of the funnel 22 is spaced from the axis of rotation by at least 1.32 times the maximum radius of the rotor 2. This creates a free space in the funnel 26 that is not touched by the rotor 2 during one revolution. Liquid can accumulate in this free space. FIG. 2 shows a maximum level 29 of the liquid that can accumulate in the funnel 26 without coming into contact with the rotor. This makes it possible, in the case of large-volume reaction vessels of a reaction vessel unit 7, to empty the main part of the liquid therein at once, to collect this in the funnel 26, so that it can gradually flow out through the outlet opening 23.

Furthermore, due to the large distance of the channel 22 from the rotor and the thus large cross-section, an air flow generated by the rotor during rotation is at its lowest in this area, so that liquid can settle at the bottom of the funnel, i.e. in the channel 22, and flows out of the channel 22 through the outlet opening 23. Because of the low flow velocity, there is also little danger that liquids, which are located in the funnel-shaped area adjacent to the channel 22, will be driven upward by the air flow.

Since the channel is limited by approximately vertical side walls 37*a*, 37*b*, even if an air flow is generated in the direction of rotation 38, it will not be able to drive the liquid out of the channel. A liquid once in the channel 22 is thus trapped therein and can only exit through the outlet opening 23. In the embodiment example shown in FIG. 2, an air flow can strike the sidewall 37*a*, which is located downstream in the channel 22 in the direction of rotation 38 of the rotor. But since the sidewall 37*a* is approximately perpendicular to the direction of flow, the fluid in the channel can no longer be driven back into the rotor chamber. In principle, a channel with an approximately vertical side wall on the downstream side of the channel 22 in the direction of rotation 38 is sufficient. However, concerning production it is expedient to produce a channel with two approximately vertical sidewalls 37*a* and 37*b*.

This formation of funnel 26 and channel 22 eliminates the need to use a suction pump.

The dispensing unit 30, which can also be referred to as the dispensing head, has several of the dispensing nozzles 31, which are arranged along a straight line and with their openings facing downwards. The dispensing unit 30 is connected to a reagent line 32, via which reagents are supplied to the dispensing unit 30, which are then dispensed downwards through the individual dispensing nozzles 31. The dispensing unit basically has the function known from WO 2018/234420 A1 that reaction vessels of a reaction vessel unit 7 can be filled with reagents when the reaction vessel unit 7 is moved past the dispensing unit 30 by means of the loading and unloading device 8.

In the first embodiment of the present invention (FIG. 4*a*), the balcony 18 is formed in the area below the dispensing unit 30 with an upwardly open channel 33, in which the reagents dispensed by the dispensing nozzles 31 are collected if no reaction vessel unit 7 is arranged below the dispensing nozzles 31, as shown in FIG. 4*a*. The channel 33 is communicatively connected to a collection tube 34, so that the reagents collected in the channel 33 flow out via the collection tube 34. The collection hose 34 opens into the hose 25 at a branch 35. With respect to rotor chamber 9, starting from branch 35, the collection hose forms an inlet line and the hose 25 forms an outlet line for discharging liquids from the rotor chamber 9. A blocking element 36 is arranged in the hose 25 downstream of branch 35, with which the passage of hose 25 can be blocked. The blocking element 36 can be a preferably electrically operated valve to open or close the passage of the hose. The blocking element can also be a hose clamp, which can be opened or closed, for example, with an actuator or by means of an eccentric.

If the blocking element 36 blocks the passage of the hose 25 and a cleaning solution is supplied by the dispensing unit 30 via the collection hose 34, then the cleaning solution flows via the hose 25 and the outlet opening 23 into the rotor chamber 9. The outlet opening 23 then serves as an inlet for the cleaning solution. In principle, it would be possible to supply cleaning solution to the rotor chamber 9 up to the level of the top of the balcony 18. However, it is expedient not to flood the ball bearings 14 of the shaft 15 with cleaning solution. The rotor chamber 9 is filled with cleaning solution up to above the level 29 (FIG. 2), so that when the rotor 2 rotates, it is immersed in the cleaning solution and takes some part of the cleaning solution with it and distributes it in the rotor chamber 9. In practice, it has been shown that the rotor chamber 9 is filled to a level 43, as shown in FIG. 2. The level 43 is about 5% of the radius of rotor 2 and preferably at least 10% of the radius of rotor 2 above the level 29, which is barely not touched during a rotation of the rotor 2.

By turning the rotor 2, the cleaning solution is distributed in the rotor chamber 9, so that all sites of the rotor chamber 9 come into contact with the cleaning solution.

While the cleaning solution is being distributed by rotating the rotor 2, cleaning solution can continue to replenish via the dispensing unit 30 to slow down or prevent the level of cleaning solution from lowering.

If the cleaning solution is sufficiently distributed in the rotor chamber 9, then a predetermined period of time can be waited for so that the cleaning solution can absorb the impurities. Here, the rotation of the rotor can be ceased or the rotor is rotated further in order to cause a continuous swirling of the cleaning solution in the rotor chamber by the air draft.

Once this cleaning step is complete, then the locking element 36 is opened so that the cleaning solution flows out through the outlet opening 23. This can be supported by further rotation with the rotor, so that the cleaning solution is driven into the channel 22.

This cleaning process of the rotor chamber 9 can be carried out fully automatically and is controlled by the central control device.

The cleaning solution used is preferably a non-foaming cleaning solution, such as formaldehyde or paraformaldehyde, with which the complete rotor chamber 9 can be reliably disinfected.

However, in the case of biological samples, in particular samples containing bacteria, it is advantageous if the cleaning solution contains surfactants, which lead to foaming of the cleaning solution when the rotor is rotated. A foaming of the cleaning solution causes a very fast and uniform distribution of the cleaning solution in the rotor chamber 9, which is why the rotational speed and/or duration with which the rotor is rotated in the rotor chamber 9 can or should be significantly reduced compared to the distribution of non-foaming cleaning solution. In order to completely remove the foamed cleaning solution from the rotor chamber 9 again, a solution that breaks down a foam is supplied to the rotor chamber 9 via the dispensing unit 30 and collecting hose 34 and distributed by rotating the rotor 2. As a result, the foam in the rotor chamber collapses and the cleaning solution flows out of the rotor chamber 9 together with the foam-degrading solution. Such a foam-degrading solution may, for example, contain alcohol. A solution containing alcohol also has the advantage that it evaporates very quickly and the rotor chamber 9 dries correspondingly quickly as a result.

Figure 4B:
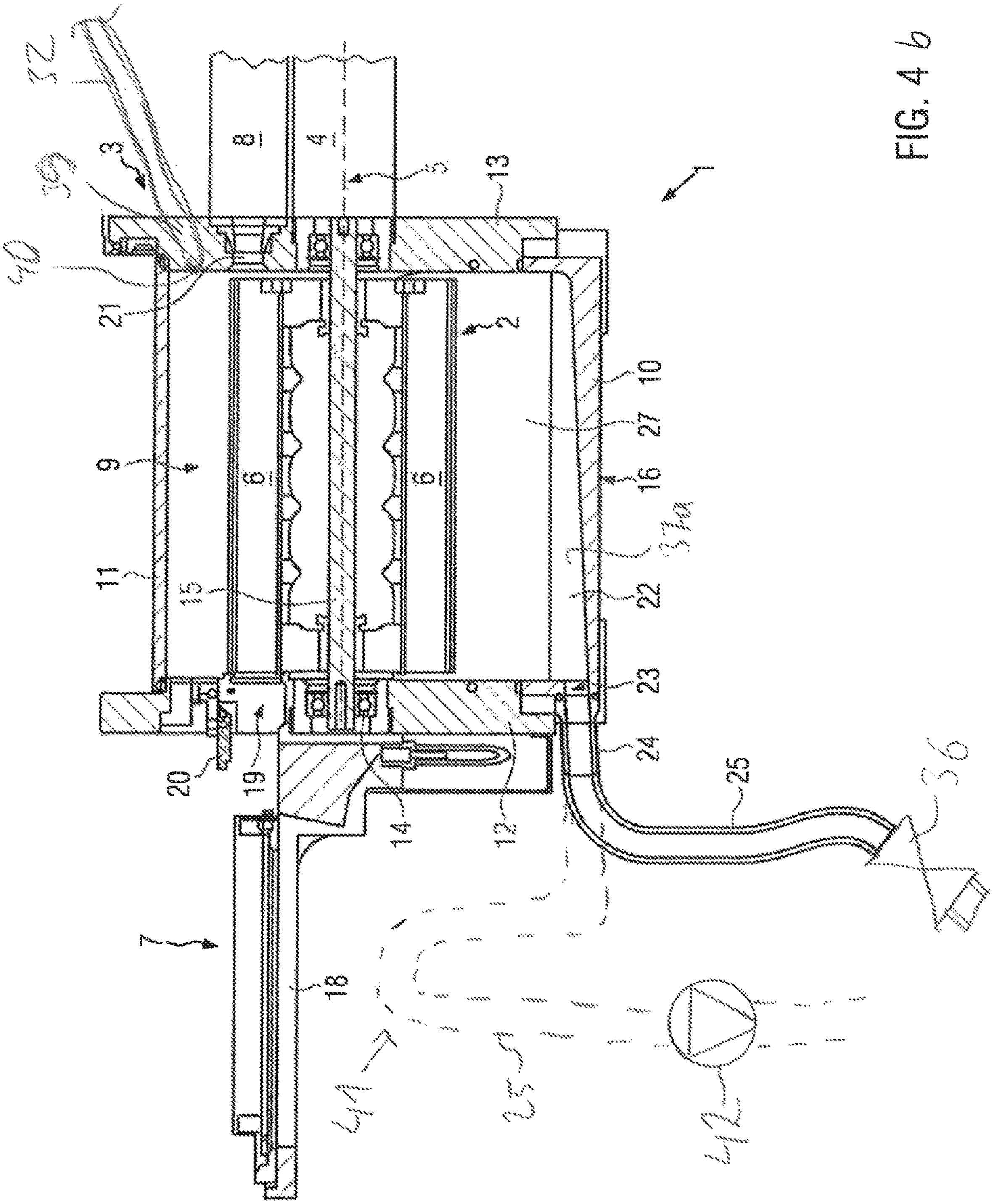

A second embodiment example of the centrifuge 1 (FIG. 4*b*) is designed substantially the same as the first embodiment, unless otherwise explained below, which is why the same parts are provided with the same reference signs and are not explained again.

The second embodiment example does not need to have a dispensing unit. A supply opening 39 is formed on the rear end 13 in the area above the shaft 15, which is connected to the reagent line 32 and opens into the rotor chamber 9. In the present embodiment, an atomizing nozzle 40 is arranged in the supply opening 39, with which reagents supplied via the reagent line 32 are atomized into the rotor chamber 9. By feeding a cleaning solution via the supply opening 39, it is entered into the rotor chamber 9 and atomized by the atomizing nozzle 40 into a mist, which is distributed evenly in the rotor chamber 9 by rotating the rotor 2. A part of the cleaning solution settles in the channel 22 and drains out of the rotor chamber 9 via the outlet opening 23 and the hose 25. This allows cleaning solution to be continuously circulated and discharged in the rotor chamber 9 to remove contaminants from the rotor chamber 9. A blocking element 36 can optionally be provided in the hose 25 to block the passage of the hose 25 and to retain cleaning solution in the rotor chamber 9.

It may also be useful to rotate the rotor alternately in different directions during the cleaning process in order to achieve the most uniform distribution of the cleaning solution in the rotor chamber.

In principle, it is also possible not to arrange an atomizer nozzle 40 in the supply opening 39. This depends on the dimensions of the rotor chamber, the rotor and the air flow generated thereby during the rotation of the rotor. Thus, sufficient distribution of the cleaning solution can be achieved by the rotation of the rotor alone and the air flow generated thereby, without the need for atomizing nozzles. On the other hand, it may also be expedient to provide several supply openings 39, in particular also on the upper shell 11, in order to achieve a uniform distribution over the entire width of rotor chamber 9 in the direction of the axis of rotation 5.

A pressure nozzle can also be inserted into the supply opening(s) 39. A pressure nozzle is a nozzle that opens when the cleaning solution is supplied to the nozzle at a predetermined pressure. As a result, the timing of the supply of cleaning solution into the rotor chamber can be precisely controlled. The pressure nozzle can also be an atomizing nozzle.

Furthermore, also in the second embodiment example, if the blocking element 36 is provided in the hose 25, so much cleaning solution can be introduced into rotor chamber 9 via the supply opening 39 until a fill level corresponding to level 43 in FIG. 2 is reached. Then by rotating the rotor, as explained in the first embodiment example above, the cleaning solution can be evenly distributed in rotor chamber 9.

Further, the second embodiment example can be modified to the effect that the hose 25 is formed into a siphon 41 (FIG. 4*b*), i.e., the hose 25 is directed upward a distance from the outlet opening 23 and then deflected downward, so that liquid flowing into the hose 25 only overcomes the siphon only when the liquid level in the rotor chamber 9 has reached the level of the siphon. In such an arrangement of the hose 25, either a suction pump 42 must be provided in the hose 25 to completely suck off the liquid from the rotor chamber 9 past the siphon 41 when required, or a lifting mechanism may be provided to lower the hose 25 in such a way, that the siphon 41 is lifted and the liquid contained in the hose 25 flows out due to gravity alone.

Also in the second embodiment example, non-foaming cleaning solutions or foaming cleaning solutions can also be supplied. If foaming cleaning solutions are used, it is expedient, just as in the first embodiment example, to feed a foam-degrading solution to the rotor chamber 9 in order to remove the foaming cleaning solution from the rotor chamber 9.

The above embodiment examples and variations show that the cleaning solution and/or cleaning solutions can be supplied to or discharged from the rotor chamber 9 in different ways to clean the rotor chamber 9. Common to all embodiment examples and variants is that the rotor 2, which is inherently present in centrifuge 1, is used to distribute the cleaning solution evenly in the rotor chamber 9. The speed of rotation and the duration with which the rotor 2 is rotated are to be adjusted accordingly to the geometry of the rotor interior 9 and the behavior of the cleaning solution. In this case, it may be particularly expedient (irrespective of the structural design of the centrifuge) to rotate the rotor 2 at least once in a clockwise direction and at least once in a counter-clockwise direction in order to obtain the most uniform distribution possible of the cleaning solution in the rotor chamber 9. If one or more atomizing nozzles 40 are used, it is advisable to supply the cleaning solution under pressure so that the atomizing nozzles 40 provide an efficient atomization of the cleaning solution.

The feeding and uniform distribution as well as the removal of the cleaning solution from the rotor chamber 9 can be carried out fully automatically. As a result, the centrifuge 1 can be used in an automatic production process in which many reaction vessel units 7 are repeatedly cleaned, whereby it is ensured in the long run that no contamination from one reaction vessel unit 7 to another reaction vessel unit 7 occurs. The intervals of the cleaning operations of the rotor chamber 9 are to be adjusted accordingly to the amount and reactivity of the reagents contained in the reaction vessel units 7. For example, such a cleaning operation can be carried out at an interval of not more than 10 minutes or not more than 60 minutes. However, in the case of less reactive reagents and small quantities, it may also be appropriate to carry out such a cleaning operation only once a day.

The cleaning process can be used to completely disinfect the interior and reliably prevent contamination by viruses, bacteria or other infectious agents.

In addition, for samples containing DNA, agents can be used as solvents to destroy nucleic acids and thus eliminate contamination. These agents are, for example, perchlorate, strong oxidizing agents and/or enzymes such as DNAses.

In the event of an unexpected contamination of the rotor chamber 9 occurs, such as a shattering of a reaction vessel unit 7 during ejection, the system can be completely cleaned without having to open the interior or the unit.

The invention can be briefly summarized as follows:

The invention relates to a centrifuge 1 for cleaning a reaction vessel unit 7 and to a method for cleaning such a centrifuge 1. The centrifuge 1 has a rotor 2 and a rotor chamber 9, in which the rotor is arranged and mounted, the rotor features a receiving area for receiving the reaction vessel unit. The rotor chamber 9 is limited by a housing 3, the housing 3 having an outlet to drain the liquid discharged from the reaction vessels and being provided with an inlet for filling the rotor chamber 9 with a cleaning solution in such a way, when the rotor 2 rotates, the rotor 2 is at least partially immersed in the cleaning solution and distributes it in rotor chamber 9 and/or the inlet is designed in such a way that the cleaning solution is distributed in rotor chamber 9 when it is supplied by the rotating rotor 2.

| Reference list | |
|---|---|
| 1 | Centrifuge |
| 2 | Rotor |
| 3 | Housing |
| 4 | Drive device |
| 5 | Axis of rotation |
| 6 | Receiving area |
| 7 | Reaction vessel unit |
| 8 | Loading and unloading device |
| 9 | Rotor chamber |
| 10 | lower shell |
| 10a | lower shell |
| 11 | upper shell |
| 11a | upper shell |
| 12 | front end wall |
| 12a | front end wall |
| 13 | rear end wall |
| 13a | rear end wall |
| 14 | Ball bearing |
| 15 | Shaft |
| 16 | Footprint |
| 17 | Rotor chamber |
| 18 | Balcony |
| 19 | Aeration and ventilation opening |
| 20 | Door |
| 21 | Passage opening |
| 22 | Channel |
| 23 | Outlet opening |
| 24 | Connection pivot |
| 25 | Hose |
| 26 | Funnel |
| 27 | Funnel surface |
| 28 | Vertical surface |
| 29 | Level |
| 30 | Dispensing unit |
| 31 | Dispensing nozzle |
| 32 | Reagent line |
| 33 | Channel |
| 34 | Collection hose |
| 35 | Branch |
| 36 | Blocking element |
| 37a | Sidewall |
| 37b | Sidewall |
| 38 | Direction of rotation |
| 39 | Supply opening |
| 40 | Atomizer nozzle |
| 41 | Siphon |
| 42 | Suction pump |
| 43 | Level |

The invention claimed is:

1. A method for cleaning a centrifuge for cleaning a reaction vessel unit, wherein the centrifuge comprises a rotor and a rotor chamber, in which the rotor is arranged and horizontally rotatably mounted, wherein the rotor comprises a receiving area for receiving the reaction vessel unit, and the rotor chamber is limited by a housing having an outlet that comprises a blocking element for blocking an outlet line, the blocking element being arranged below the rotor chamber, the method comprising:

under control by a control unit, filling the rotor chamber with a cleaning liquid provided via an inlet either at least up to a predetermined level, so that when the rotor is rotated it is at least partially immersed in the cleaning solution, and/or the cleaning solution is supplied to the rotor chamber in such a way that it can come into contact with the receiving area of the rotor to be atomized into the rotor chamber, wherein providing the rotor chamber with the cleaning liquid comprises blocking the outlet line by the blocking element such that the cleaning liquid is supplied to the rotor chamber without flowing through the outlet line, thus retaining the cleaning solution in the rotor chamber to the predetermined level;

the control unit controlling rotating of the rotor to distribute the cleaning solution in the rotor chamber, and then the control unit controlling removing of the cleaning solution from the rotor chamber, wherein removing of the cleaning solution from the rotor chamber comprises opening the blocking element such that the outlet line is not blocked by the blocking element and the cleaning solution drains off from the rotor chamber via the outlet line.

2. The method according to claim 1, wherein the cleaning solution contains formaldehyde or paraformaldehyde.

3. The method according to claim 2, wherein the cleaning solution is a foaming cleaning solution, including a surfactant, and for removing the cleaning solution a foam-degrading solution is supplied to the rotor chamber, which contains alcohol.

4. The method according to claim 3, wherein during or after the supply of a foam-degrading solution, the rotor is rotated to distribute the foam-degrading solution in the rotor chamber.

5. A centrifuge cleaning system, comprising:

a rotor having a horizontal axis of rotation;

a housing defining a rotor chamber, in which the rotor is arranged and rotatably mounted, the housing having an outlet to discharge any liquid discharged, and being provided with an inlet for supplying the rotor chamber with a cleaning solution, wherein the outlet has an outlet line and a blocking element for blocking the outlet line, the blocking element being arranged below the rotor chamber;

a microtiter plate to be received into a receiving area of the rotor, the microtiter plate comprising 6 or more reaction vessels;

a control unit configured for 1) filling the rotor chamber with a cleaning liquid at least up to a predetermined level, so that when the rotor is rotated the receiving area is at least partially immersed in the cleaning solution, 2) rotating the rotor to distribute the cleaning solution in the rotor chamber through contact between the receiving area and the cleaning solution, and 3) removing the cleaning solution from the rotor chamber via the outlet; and a filling level sensor configured for detecting a fill level in the rotor chamber, wherein when the blocking element is blocking the outlet line, the cleaning solution can be supplied to the rotor chamber via the inlet without flowing through the outlet line such that the cleaning solution is supplied to and retained in the rotor chamber to the predetermined level, and when the blocking element is opened and not blocking the outlet line, the cleaning solution can drain off from the rotor chamber via the outlet line.

6. A centrifuge for cleaning a reaction vessel unit with a rotor and a rotor chamber, in which the rotor is arranged and rotatably mounted, wherein the rotor comprises a receiving area for receiving the reaction vessel unit, and the rotor chamber is limited by a housing, the housing having an outlet to discharge any liquid discharged from the reaction vessel unit, and being provided with an inlet for supplying the rotor chamber with a cleaning solution in such a way that the cleaning solution is distributed in the rotor chamber by rotation of the rotor by contact with the receiving area of the rotor so that the rotor chamber is cleaned, wherein the axis of rotation of the rotor is horizontal, and the centrifuge comprises a control unit configured for 1) filling the rotor chamber with a cleaning liquid at least up to a predetermined level, so that when the rotor is rotated it is at least partially immersed in the cleaning solution, 2) rotating the rotor to distribute the cleaning solution in the rotor chamber, and 3) removing the cleaning solution from the rotor chamber, wherein the outlet comprises a blocking element for blocking an outlet line, the blocking element is arranged below the rotor chamber, and when the blocking element is blocking the outlet line, the cleaning solution can be supplied to the rotor chamber via the inlet without flowing through the outlet line such that the cleaning solution is supplied to and retained in the rotor chamber to the predetermined level, and when the blocking element is opened and not blocking the outlet line, the cleaning solution can drain off from the rotor chamber via the outlet line.

7. The centrifuge according to claim 6, wherein the outlet has a suction pump and a siphon, wherein the siphon is designed in such a way that when the suction pump is not actuated, a liquid with a fill level below a predetermined fill level remains in the rotor chamber.

8. The centrifuge according to claim 6, wherein a filling level sensor is provided for detecting the fill level in the rotor chamber.

9. The centrifuge according to claim 6, wherein the inlet is arranged above an axis of rotation of the rotor, so that when the cleaning solution is supplied, it can come into contact with the rotor.

10. The centrifuge according to claim 6, wherein the inlet has one or more nozzles for atomizing the cleaning solution into the rotor chamber.

11. The centrifuge according to claim 6, wherein the receiving area is adjacent to a loading and unloading opening.

12. The centrifuge according to claim 6, wherein the outlet of the housing also forms the inlet.

13. The centrifuge according to claim 12, wherein an opening in the housing, which forms the outlet and the inlet, is connected to a liquid line, which has a branch and branches into an inlet line and the outlet line.

14. The centrifuge according to claim 13, wherein the inlet line is fluidically coupled to a dispensing device integrated in the centrifuge, so that the inlet line can be supplied with a cleaning solution by means of the dispensing device.

* * * * *